(12) United States Patent
Sexton et al.

(10) Patent No.: US 7,901,838 B2
(45) Date of Patent: Mar. 8, 2011

(54) CORROSION-RESISTANT INTERCONNECTS FOR FUEL CELLS

(75) Inventors: Brett Alexander Sexton, Balwyn North (AU); Fiona Lee Glenn, Clifton Hill (AU); Sarbjit Singh Giddey, Glen Waverley (AU); Sukhvinder P. S. Badwal, Clayton (AU)

(73) Assignee: Commonwealth Scientific and Industrial Research Organisation, Campbell, ACT (AU)

( * ) Notice: Subject to any disclaimer, the term of this patent is extended or adjusted under 35 U.S.C. 154(b) by 960 days.

(21) Appl. No.: 11/708,263

(22) Filed: Feb. 20, 2007

(65) Prior Publication Data
US 2008/0199767 A1    Aug. 21, 2008

(51) Int. Cl.
H01M 8/00    (2006.01)
H01M 4/64    (2006.01)
C25D 5/02    (2006.01)
C25D 5/12    (2006.01)
C25D 5/34    (2006.01)

(52) U.S. Cl. ......... 429/535; 429/518; 205/122; 205/181; 205/205

(58) Field of Classification Search .............. 429/39, 429/122; 205/640, 122, 170, 181, 205; 216/39
See application file for complete search history.

(56) References Cited

U.S. PATENT DOCUMENTS

| | | | |
|---|---|---|---|
| 3,940,319 A | 2/1976 | Pollack | |
| 5,858,567 A | 1/1999 | Spear, Jr. et al. | |
| 5,942,349 A | 8/1999 | Badwal et al. | |
| 6,051,331 A | 4/2000 | Spear, Jr. et al. | |
| 6,858,341 B2 | 2/2005 | Edlund | |
| 7,147,677 B2 | 12/2006 | Edlund | |
| 2002/0004155 A1 | 1/2002 | Haltiner et al. | |
| 2004/0115507 A1 | 6/2004 | Potter et al. | |
| 2007/0003813 A1* | 1/2007 | Vyas et al. ...................... | 429/38 |

FOREIGN PATENT DOCUMENTS

WO    WO-2006059943 A1    6/2006

OTHER PUBLICATIONS

International Search Report and Written Opinion for Application No. PCT/AU2008/000217, dated Mar. 25, 2008.

* cited by examiner

*Primary Examiner* — Ula C. Ruddock
*Assistant Examiner* — Thomas H. Parsons
(74) *Attorney, Agent, or Firm* — Nelson Mullins Riley & Scarborough LLP; Anthony A. Laurentano

(57) ABSTRACT

A method of construction of an electrochemical interconnect plate, the method comprising the steps of: (a) etching predetermined fluid flow channels in a first conductive sheet; and (b) coating the first conductive sheet with a corrosion resistant layer of nickel and tin.

18 Claims, 9 Drawing Sheets

CORROSION-RESISTANT INTERCONNECTS FOR FUEL CELLS

FIELD OF THE INVENTION

The present invention relates to the field of electrochemical interconnect plates, and, in particular, discloses a corrosion protected fuel cell interconnect.

BACKGROUND OF THE INVENTION

A fuel cell is an electrochemical device that converts chemical energy of a fuel (such as hydrogen, methanol, ethanol) and oxidant (oxygen from air) into electrical energy and heat. The fuel cell has all the attributes of a battery, except that a fuel cell continues to produce electricity as long as fuel and oxidant are available, as opposed to a battery that stops producing power when the stored chemicals are exhausted. Several different types of fuel cells are under development. Amongst these, polymer electrolyte membrane (PEM) fuel cell is regarded as the most suitable technology for transport and small scale distributed power generation applications, because they operate at low temperatures (70-80° C.) and offer rapid start and shut down, unlimited thermal cycling capability and excellent load following characteristics. Around 50% of the power is available at cold start. A conventional polymer electrolyte membrane fuel cell stack consists of a number of cells called membrane electrode assemblies (MEAs) assembled together in series with the help of interconnect (bipolar middle and unipolar end ones) plates to produce the required stack voltage and power. Each cell (or MEA) consists of a proton conducting polymer membrane sandwiched between a hydrogen (anode) electrode and an oxygen (cathode) electrode. The interconnect plates serve dual purpose: to electrically connect one cell to the other (to conduct electrical current) and to distribute reactants (as well collect products) to (from) the respective electrodes of the MEAs. Hydrogen and air (source of oxygen) are supplied to the electrodes via flow field gas channels in the interconnect plates. On shorting the cell (or stack) through an external load hydrogen supplied to the anode gets oxidised to protons and electrons. Electrons travel through the external load and protons are transported through the membrane to the cathode, where they react with the oxygen supplied to cathode side and electrons from the external load to produce water as per following reactions.

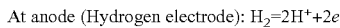
At anode (Hydrogen electrode): $H_2=2H^++2e$

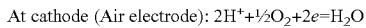
At cathode (Air electrode): $2H^++\frac{1}{2}O_2+2e=H_2O$

The oxygen-depleted air along with the water formed on the air side of the MEA electrodes are collected by the gas flow channels. The air supplied to the oxygen electrode, in addition to supplying oxygen, also helps in the removal of water formed at the electrode and thereby uncovering the reaction sites for more oxygen (air) access for the reaction. The voltage from a single cell under load conditions is in the range of 0.5 to 1.0V DC and current densities in the range 100 to 700 $mA.cm^{-2}$.

In the case of micro fuel cells for portable power applications, the fuel cell system is required to be smaller, simpler (without or less moving parts) and easily manufacturable at mass scale. This is where the concept of self air breathing (no air compressors for oxygen supply to fuel cell), passive operation (no moving parts), miniaturisation of components (interconnects, micro fluid flow channels, overall system) and cheap fabrication methods have to be introduced to compete with batteries.

The material used for interconnect is required to have relatively high electrical conductivity, high corrosion resistance, low contact resistance and impervious to supplied fuel and oxidant. The conventional method of fabricating interconnects for fuel cells is by machining the flow channels into any electrically conducting material such as graphite or steel etc. The machining process is labour intensive and there is a limitation on the geometry and minimum size of the channels that can be made. Moreover, mass production techniques are required to cater for low cost and large volume market (e.g. battery replacement).

Examples of interconnect plate manufacture are known. For example, U.S. Pat. Nos. 7,147,677, 6,858,341, 6,051,331 and 5,858,567 provide examples of interconnect plates.

SUMMARY OF THE INVENTION

It is an object of the present invention to provide an improved method of manufacture of electrochemical cell interconnect.

In accordance with a first aspect of the present invention, there is provided a method of construction of an electrochemical interconnect plate, the method comprising the steps of: (a) etching predetermined fluid flow channels in a first conductive sheet; and (b) coating the first conductive sheet with a corrosion resistant layer.

In one embodiment, the corrosion resistant layer can be substantially formed from multiple layers of nickel and tin. The etching preferably can include electro-etching of the first conductive sheet. The first conductive sheet can be formed substantially from copper.

Preferably, the step (a) can comprise masking the first conductive sheet with a photosensitive resist, photo-exposing the resist, developing the resist photopattern and etching the resultant photopattern. The resist can be a laminatable resist, i.e. dry film as used for circuit board manufacture.

Preferably, the corrosion resistant layer can be electroplated on the first conductive sheet. In other embodiments, the first conductive sheet can be formed substantially from one of: brass, stainless steel, titanium or nickel. In other embodiments, the corrosion resistant layer preferably can include a layer of at least one of: nickel alloys, gold, palladium, platinum or chromium. In some embodiments, the coating can be deposited by one of sputtering, spraying, physical vapour deposition, e-beam evaporation or chemical vapour deposition.

In accordance with a further aspect of the present invention, there is provided an electrochemical cell interconnect plate including a first planar conductive substrate having a series of fluid flow channels etched in at least a first surface thereof, and a corrosion resistant layer formed on the first conductive layer.

BRIEF DESCRIPTION OF THE DRAWINGS

Benefits and advantages of the present invention will become apparent to those skilled in the art to which this invention relates from the subsequent description of exemplary embodiments and the appended claims, taken in conjunction with the accompanying drawings, in which:

FIG. 19 illustrates a graph of life time performance of a single fuel cell using interconnect plate constructed in accordance with the preferred embodiment, i.e. with multilayers of nickel and tin coatings on the interconnect.

DESCRIPTION OF THE PREFERRED AND OTHER EMBODIMENTS

Figure 1:
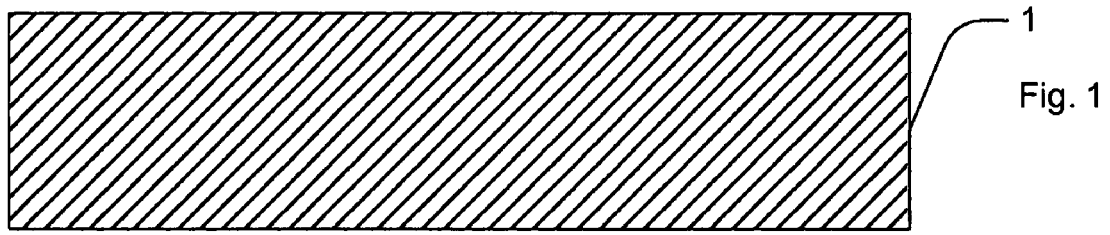
FIG. 1 to FIG. 6 are schematic sectional views of the various steps in the construction of the preferred embodiment.

In the preferred embodiment, a method involving micro-technology to fabricate interconnects with micro fluid flow channels for micro fuel cells is described. The interconnect involves photo-masking of the metallic substrate (particularly copper or brass) using a dry film resist, UV exposure and subsequent photo development of the desired fluid flow pattern, electro-chemical etching (also known as electrochemical machining) to make micro channels, and finally, electroplating of the channels with a combination of corrosion resistant metals. This method is extremely fast and scalable, and therefore lends itself to mass manufacturing of interconnects for micro fuel cells.

The process allows the fabrication of interconnects with channel dimensions (width and depth) as small as 50 microns. For channel dimensions of less than 50 microns, spin-on liquid photoresists can be used. Interconnects thus made can be either used in a stack or can be individually embedded in a non-conducting substrate to make a planar array fuel cell unit. The process has been successfully demonstrated for single cells as well as an eight cell planar array fuel cell unit ($2W_e$).

The process described is particularly suited to the manufacture of copper or brass interconnects, with microchannels which are subsequently electroplated with several different layers of metals for corrosion protection. The coating materials substantially increase the lifetime of the interconnect.

There are therefore a number of advantageous features of preferred embodiments. These include:

Fabrication from a solid copper or brass sheet, i.e. inexpensive substrate which has an intrinsically high electrical conductivity.

Use of a photo-lithographic process to define the microchannel patterns with dry film resist similar to that used in the printed circuit industry.

Either a chemical etch or more preferably, an electrochemical etch (electrochemical machining) is performed through the dry film photo-mask to define the channels in a short time (20 minutes). Chemical etching was found to be much slower.

This process allows fabrication of complex flow field designs with micro channels as small as 50 μm. For channel dimensions of less than 50 microns, spin-on liquid photoresists can be used.

The methods of the preferred embodiment allow for manufacture of interconnects with micro channels on one side or on both sides of the conductive sheet.

Application of a corrosion-resistant coating ensures the interconnect has a lifetime of 3000 plus hours in operation.

The process is scalable to large sheet sizes (up to 100 cm×100 cm typically) where many interconnects can be etched in the one batch operation.

Metal interconnect as opposed to graphite material conventionally used for interconnects, allows substantial reduction in the thickness of the interconnect resulting in the overall miniaturisation of the device.

These micro fabricated interconnects with fluid flow fields consisting of channels and ribs of dimensions as small as 50μ are intended for use primarily in micro-fuel cells. The interconnects can be used for any fuel (hydrogen, methanol, ethanol etc.) and for any oxidant (oxygen, air). These interconnects can also be used for electrolysis cells/stacks for hydrogen and oxygen generation or any other electrochemical device. The interconnects fabricated by this process (with micro channels) may also have application in micro chemical/electrochemical reactors where large mass and/or heat exchange areas are required to expedite reactions. Increasing the number of ribs and channels per unit area reduces electronic paths and increase the uniformity of fluid flow distribution.

A new method for fabrication of micro fuel cell interconnects has been developed. The interconnect consists of a thin electrically conducting sheet of copper, brass or any other metal/alloy), with flow field of micro channels for fuel/oxidant, and a corrosion resistant coating of metals such as nickel, tin or any combination of these metals, to protect the substrate material from degradation in the fuel cell environment.

Initially, as shown in FIG. 1, in a typical fabrication process, a thin (200-400 μm) metal sheet 1 of copper, brass or any other metal/alloy is cut to size.

Figure 2:
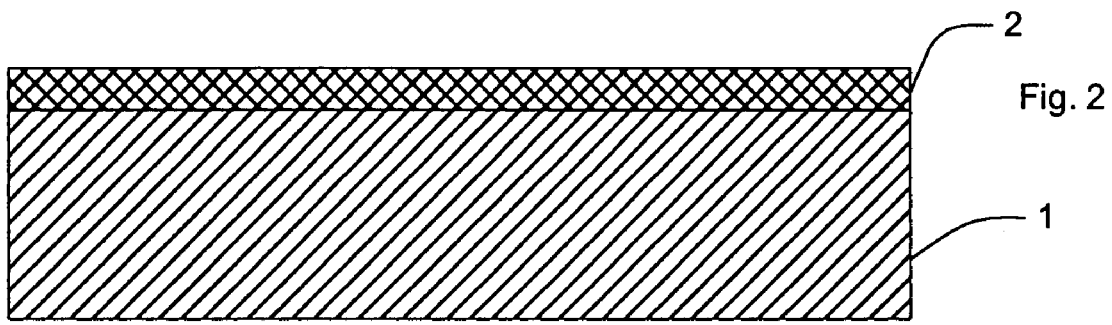

As shown in FIG. 2, the copper surface is then laminated with a dry film resist 2. The desired micro channel pattern is photo exposed with a UV exposure of 10-15 seconds on a UV light source.

Figure 3:
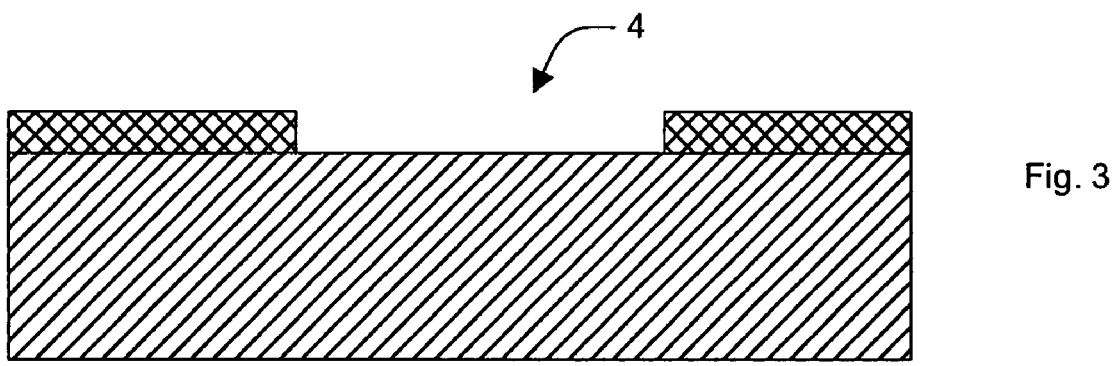

Next, as illustrated in FIG. 3, the photoresist 4 is developed in a sodium carbonate solution at 30° C. The unwanted areas on the micro channel side of the sheet and the entire back side of the sheet is masked off (not shown).

Figure 4:
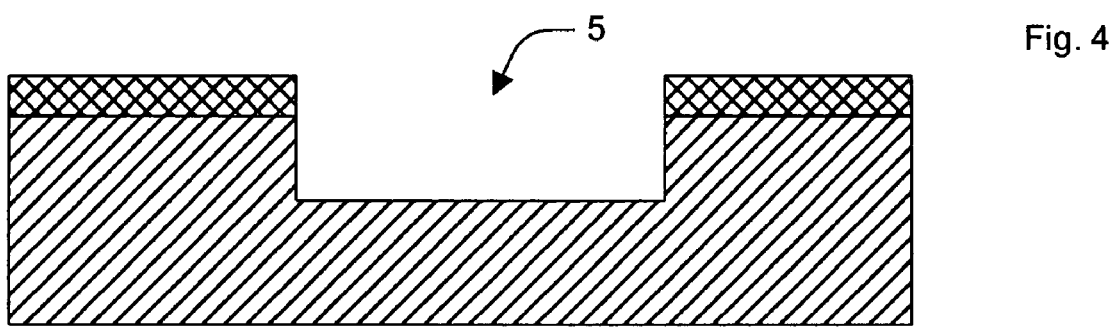

As shown in FIG. 4, micro channels 5 are then formed by electro-etching the sheet in a preheated solution (30° C.) of ammonium persulphate. Other etching solutions would be used for different metals. The desired width and depth of the channels are obtained by fixing the variables such as solution strength, solution temperature, applied voltage, etching time, etc.

Figure 5:
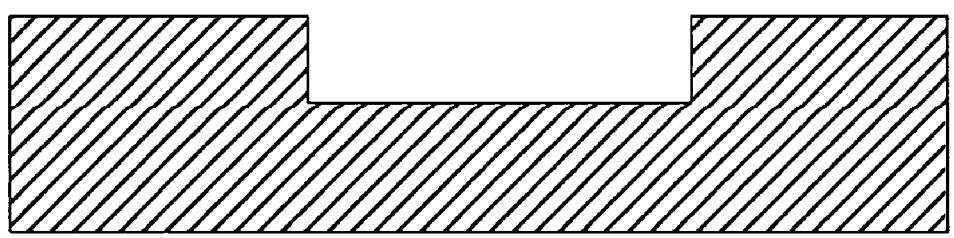

Next, as shown in FIG. 5, the residual photo resist (mask) is removed by washing or agitating the interconnect sheet in a dilute NaOH solution. The interconnect surface, before coating, is activated by keeping the interconnect in a 10 g/l sulphamic acid solution bath for a short while (10 seconds).

Figure 6:
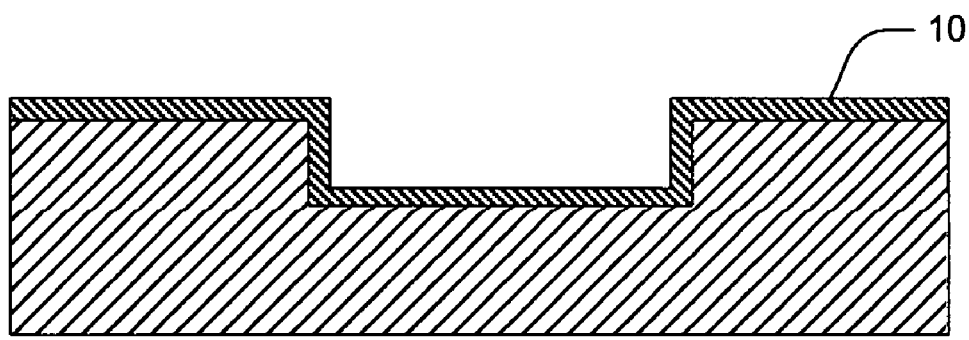
Figure 7:
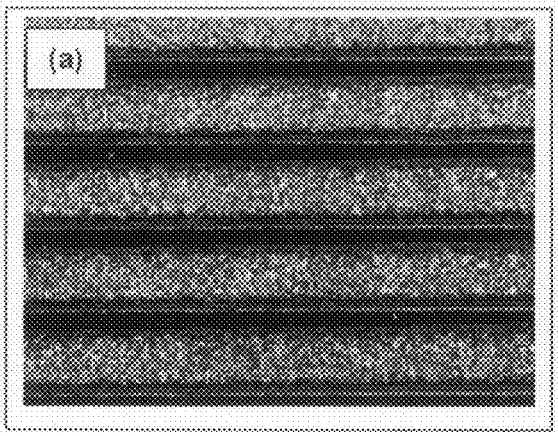
FIG. 7 to FIG. 10 illustrate photographs of an interconnect plate at different resolutions before nickel coating.
Figure 8:
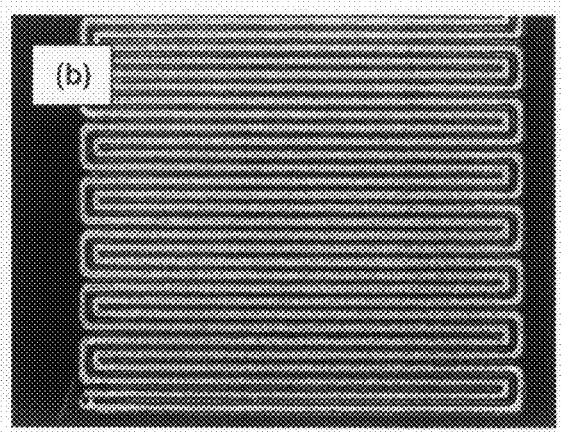
Figure 9:
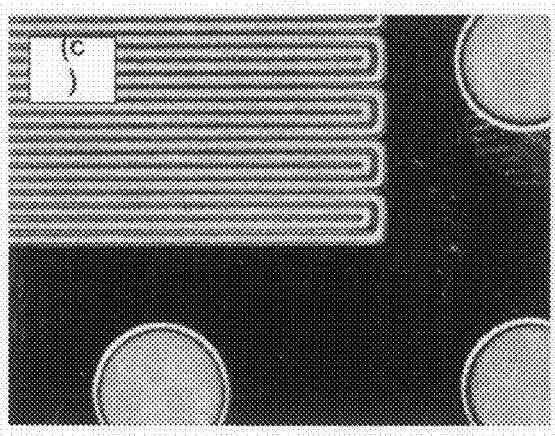
Figure 10:
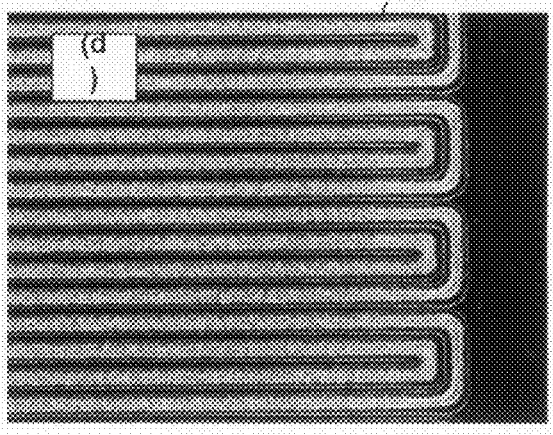
Figure 11:
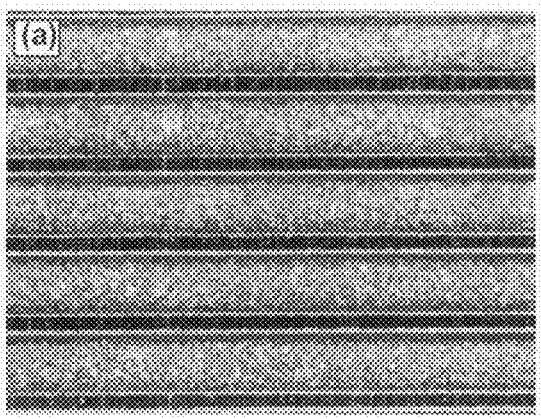
FIG. 11 to FIG. 14 illustrate photographs of an interconnect plate at different resolutions after nickel and tin coating.
Figure 12:
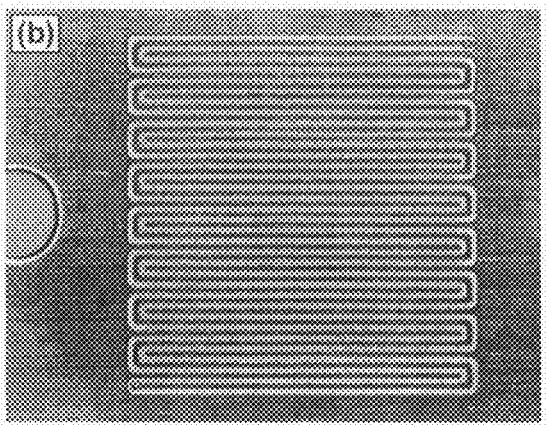
Figure 13:
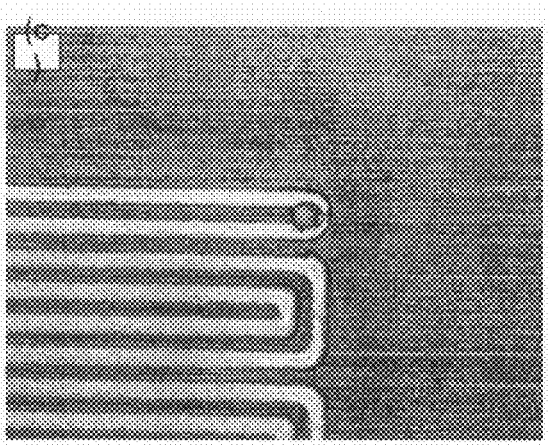
Figure 14:
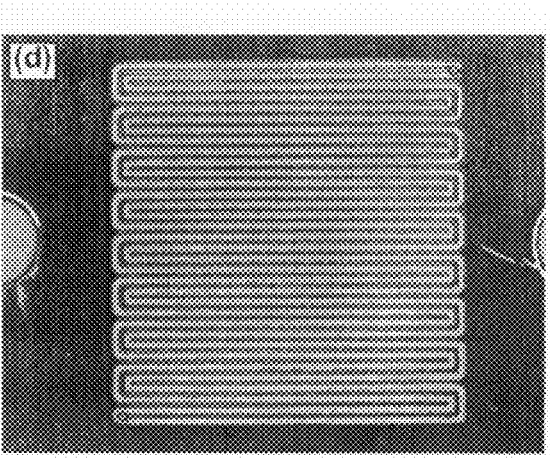

Next, as shown in FIG. 6, the electroplating of nickel and tin metals 10 on the interconnect sheet is carried out alternately for different periods of time to produce the desired combination of the metals. Nickel sulphamate and matte tin baths at 45° C. were used for electroplating respectively of the nickel and tin. The desired thickeners of the individual coatings was obtained by fixing the variables such as solution strength and temperature, applied voltage and coating time. Coatings with thicknesses up to 20 microns can be applied by increasing the electroplating time, for improved corrosion resistance.

FIG. 7 to FIG. 10 illustrate photograph of varying resolutions of a copper sheet having etched micro channels e.g. 70 before electroplating.

FIG. 11 to FIG. 14 illustrate the same sheet after it has been nickel plated. The channel widths are approximately 400 microns wide and 100-135 microns deep.

Figure 15:
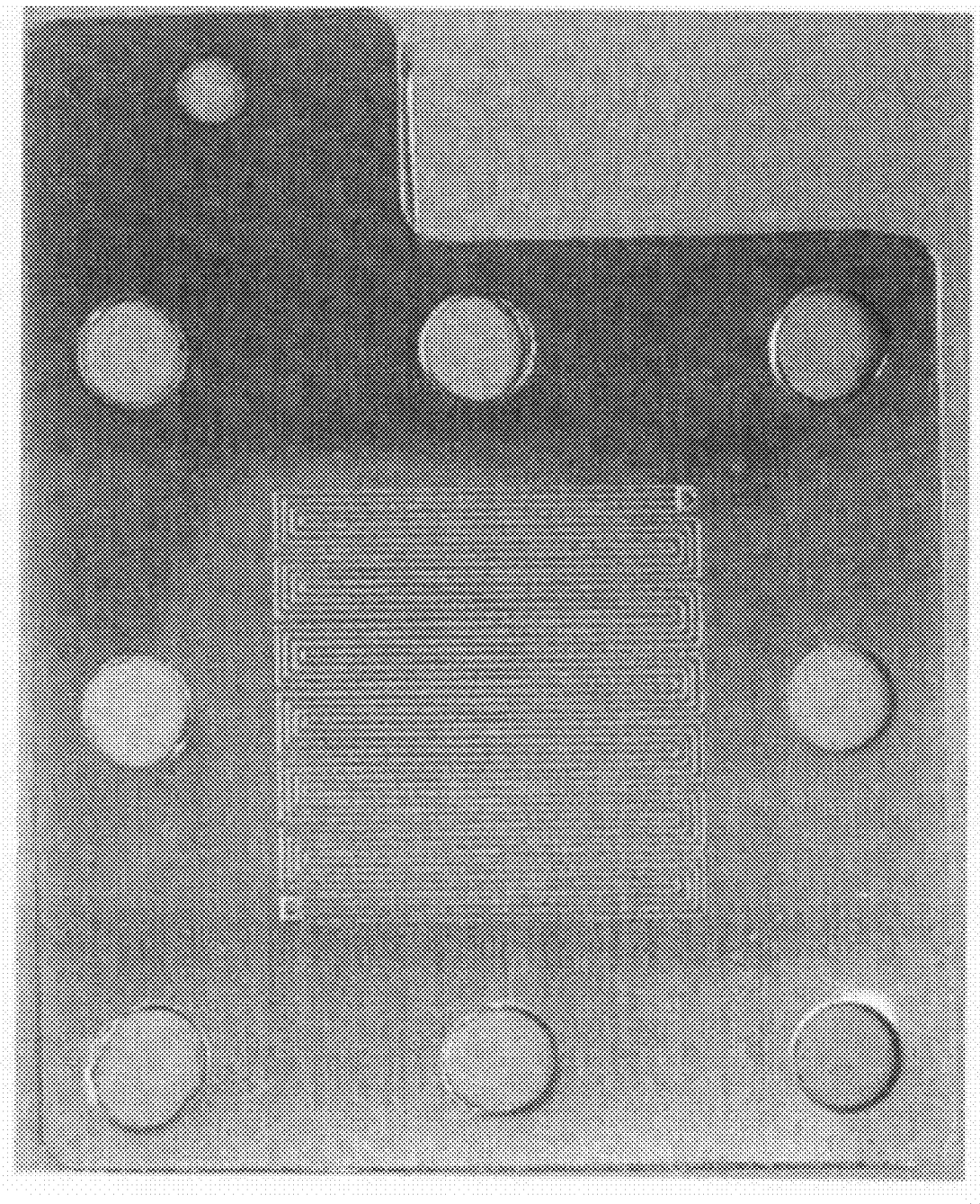
FIG. 15 illustrates a photograph of an interconnect plate before nickel and tin coating.
Figure 16:
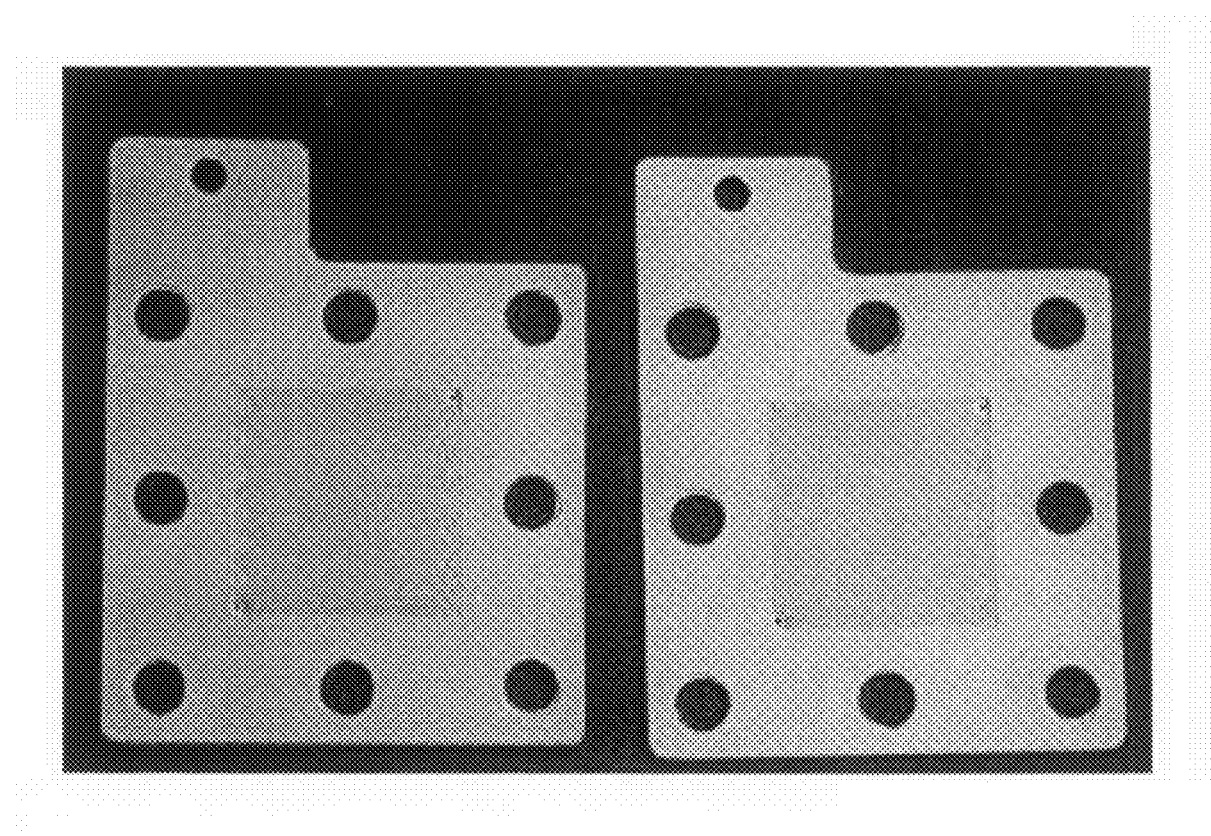
FIG. 16 illustrates a photograph of two interconnect plates after nickel and tin coating.

FIG. 15 is a photo of a 4-channel serpentine flow field etched copper plate with nickel/tin coating;

FIG. 16 is a photo of two nickel/tin coated micro fabricated copper interconnects with double channel serpentine flow fields approximately 100 μm deep.

Figure 17:
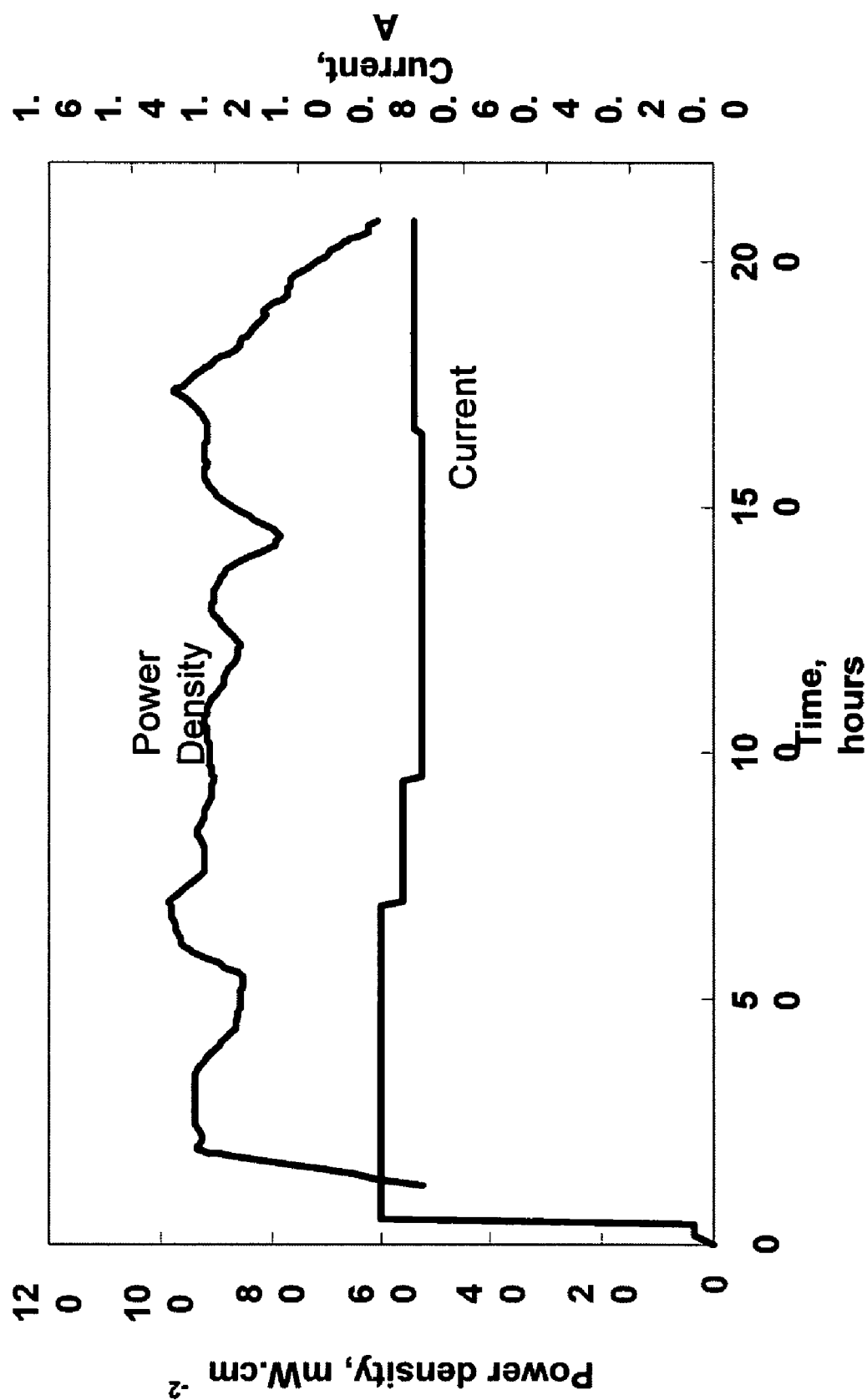
FIG. 17 illustrates a graph of life time performance of a single fuel cell with nickel only coating on the interconnect plate.
Figure 18:
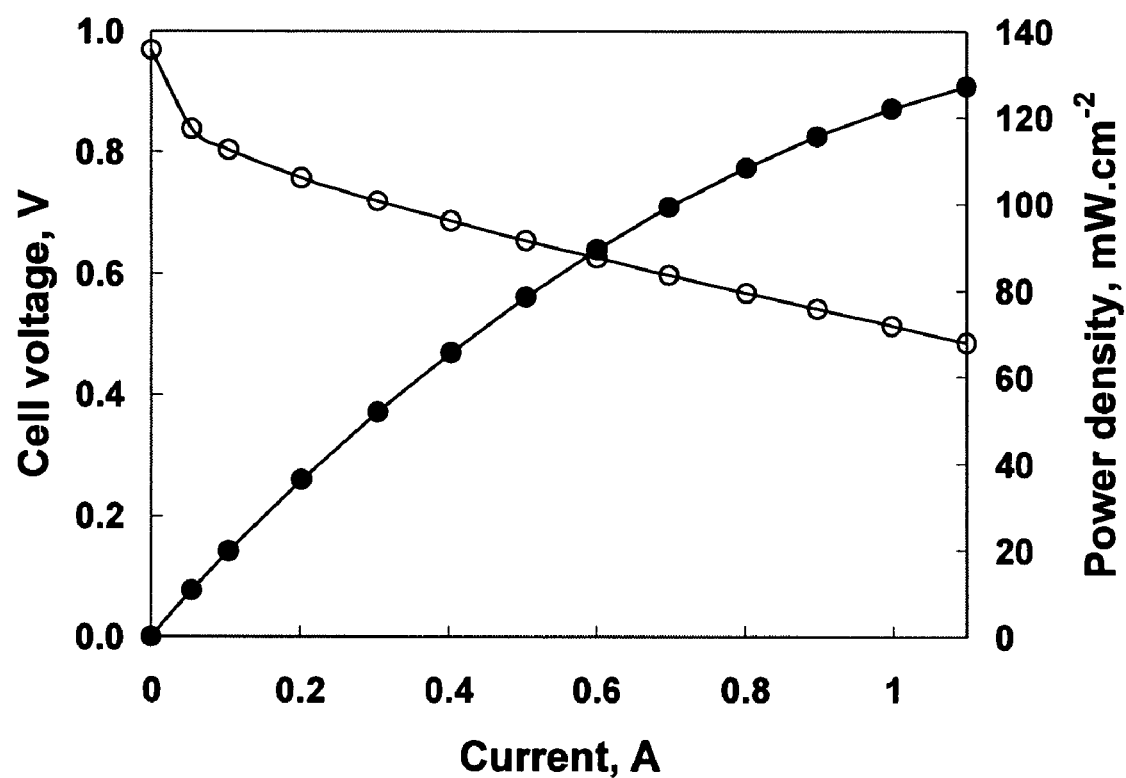
FIG. 18 illustrates a graph of operational characteristics of a fuel cell using interconnect plates constructed in accordance with the preferred embodiment.
Figure 9:
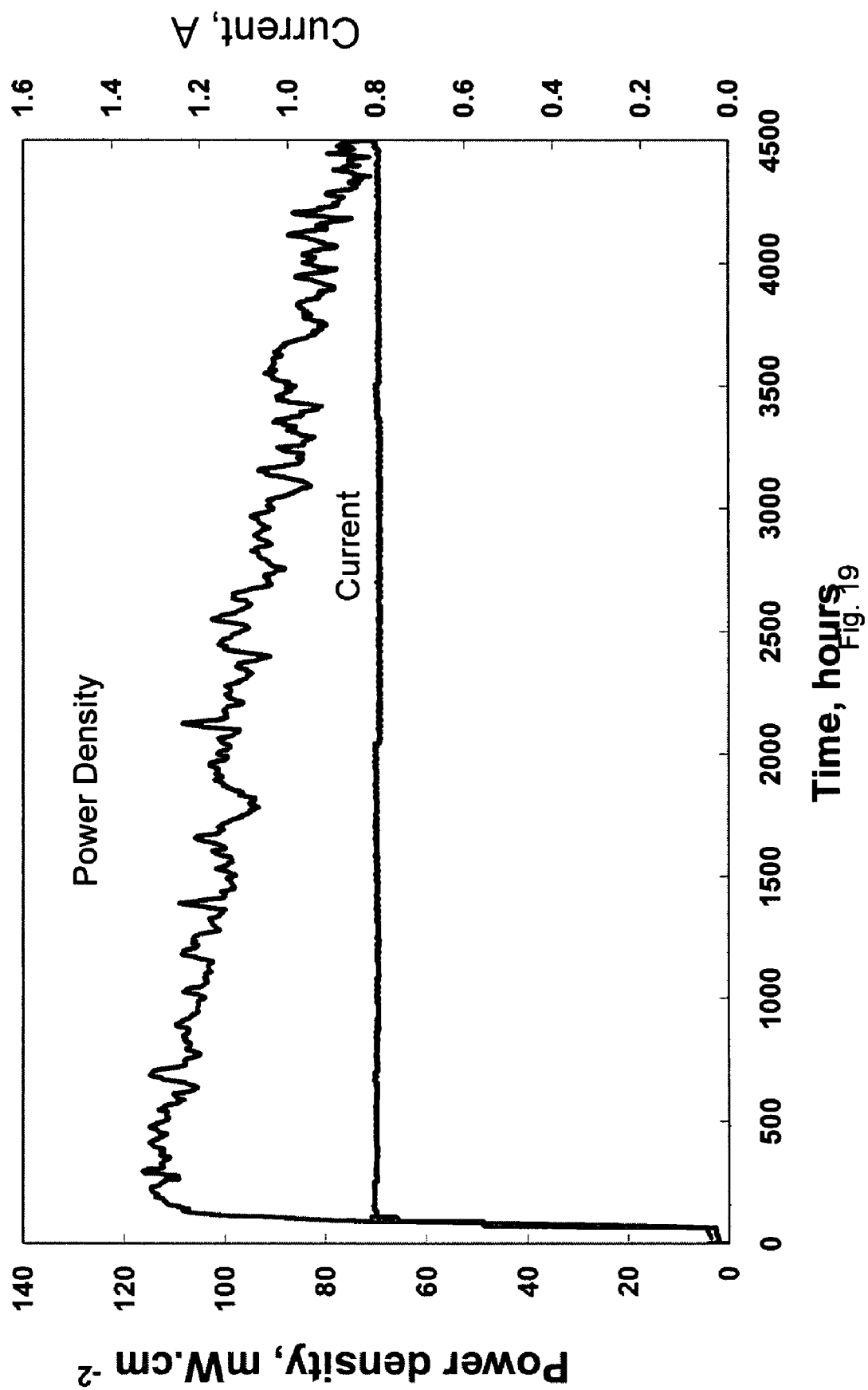

A number of interconnects fabricated following the above procedure were tested in self air breathing single cells. Hydrogen was used as the fuel and oxygen (as air) as the oxidant. The cells were operated using industrial grade hydrogen. FIG. 17 is a graph showing the life time performance of nickel only coated interconnect. The performance degradation was quite high leading to cell failure after only 200 hours of accumulated operation. FIG. 18 shows voltage-current characteristics of a 4 cm$^2$ active area self air breathing cell assembled using a nickel/tin coated micro fabricated interconnect with 200 μm wide and 100 μm deep channels. The maximum power density achieved from this cell was 135 mW.cm$^{-2}$. A cell with interconnect fabricated following the above procedure with multilayers of nickel and tin coatings (FIG. 19) has been tested for lifetime performance, and over the 4500 hours of accumulated operation the power density changed from 108 mW.cm$^{-2}$ to an average value of 80-83 mW.cm$^{-2}$.

The preferred embodiment therefore provides a method for the mass fabrication of micro-fuel cell interconnects. This method uses electrochemical etching of copper, brass or other metal panels via a photo-film mask process to produce well formed micro-channels in less than 20 minutes. The process is scalable and lends itself to mass manufacture of fuel cell interconnects as well as the manufacture of multiple-cell structures on a planar substrate. Laminatable dry film is an appropriate resist to use. The preferred coating for corrosion protection is a multilayer structure consisting of nickel and tin to a thickness of a few micrometers each. Interconnects with these coatings have produced power densities as high as 135 mW.cm$^{-2}$ and lifetimes of over 4500 hours.

Whilst the fuel cell interconnects fabricated and tested in accordance with the preferred embodiment have a copper sheet substrate with micro channel flow field, and with a corrosion resistant coating (a combination of nickel and tin based coating), these interconnects can also be fabricated using other metallic substrates such as brass, and combination of several other corrosion resistant metal coatings can be used to improve the performance and lifetime of the interconnect. Hence, in another variation, metals such as stainless steel, titanium and nickel can be used with an appropriate electro-chemical etchant. In another variation, the under layer may be replaced by alloys of Ni with various other metals. In a further variation, the protective coating may, apart from Sn, consist of one or more metals from the transition or rare earth groups of metals. In another variation Sn may be replaced or combined with, for example, gold, palladium, platinum, chromium.

In a further variation, the protective coating may, apart from Sn, consist of small quantity of a metal oxide to increase wear resistance of the coating. In another variation these may be deposited by a range of physical and chemical coating techniques such as sputtering, spraying, physical vapour deposition, e-beam evaporation, chemical vapour deposition, etc. In a further variation, the protective coating may, apart from Sn, consist of one or more metals from the group Ni, Sn, Au, Cu, Co, Cr and other electroplatable metals. In another variation, single layer of metals coated may include alloys such as Ni—Co, Ni—Fe, or other electroplatable alloy systems. In a variation to the serpentine flow channels design, several other designs such as parallel or cross flow design, with different channel and rib dimensions can be fabricated into metallic substrate.

Although the present invention has been described with particular reference to certain preferred embodiments thereof, variations and modifications of the present invention can be effected within the spirit and scope of the following claims.

We claim:

1. A method of construction of an electrochemical interconnect plate for a fuel cell, the method comprising the steps of:
   (a) etching predetermined fluid flow channels in a first conductive sheet; and
   (b) coating said first conductive sheet with a corrosion resistant layer substantially formed from alternating individual layers of tin and nickel.

2. A method as claimed in claim 1 wherein said etching includes electro-etching of said first conductive sheet.

3. A method as claimed in claim 1 wherein said etching includes chemical etching of said first conductive sheet.

4. A method as claimed in claim 1 wherein said first conductive sheet is formed substantially from copper.

5. A method as claimed in claim 1 wherein said step (a) comprises masking the first conductive sheet with a photosensitive resist, photo exposing the resist, developing the resist photopattern and etching the resultant photopattern.

6. A method as claimed in claim 5 wherein said photosensitive resist is a laminatable resist.

7. A method as claimed in claim 5 wherein said photosensitive resist is a spin-on or screen-printable liquid photoresist.

8. A method as claimed in claim 1 wherein said corrosion resistant layer is electroplated on said first conductive sheet.

9. A method as claimed in claim 1 wherein said first conductive sheet is formed substantially from one of: brass, stainless steel, titanium, alloy steel or nickel.

10. A method as claimed in claim 1 wherein said corrosion resistant layer includes a layer, or multiple layers of at least one of: gold, palladium, platinum, chromium, lead, or indium.

11. A method as claimed in claim 1 wherein said coating is deposited by one of sputtering, spraying, physical vapour deposition, e-beam evaporation or chemical vapour deposition.

12. A method as claimed in claim 1 wherein said nickel layer comprises an alloy of nickel.

13. A method as claimed in claim 1 wherein the corrosion resistant layer includes one or more metals from the transition or rare earth groups of metals.

14. A method as claimed in claim 1 wherein the corrosion resistant layer includes a tin layer combined with gold, palladium, platinum, chromium or silver.

15. A method as claimed in claim 1 wherein the corrosion resistant layer includes a metal oxide to increase wear resistance of the coating.

16. A method as claimed in claim 1 wherein the width or depth of the flow channel is substantially between 20 microns to 1000 microns.

17. A electrochemical cell interconnect plate for a fuel cell including a first planar conductive substrate having a series of fluid flow channels etched in at least a first surface thereof, and a corrosion resistant layer formed on said first conductive layer, said corrosion resistant layer including alternating individual deposited layers of nickel and tin.

18. A method of construction of an electrochemical interconnect plate for a polymer electrolyte membrane fuel cell, the method comprising the steps of:
  (a) electrochemically etching predetermined fluid flow channels in a first conductive sheet; and
  (b) coating said first conductive sheet with a corrosion resistant coating comprising alternate individual layers of tin and nickel.

* * * * *